June 21, 1966     D. PAPAGEORGES     3,256,744
HIGH RESISTANCE V BELT
Filed Dec. 16, 1963
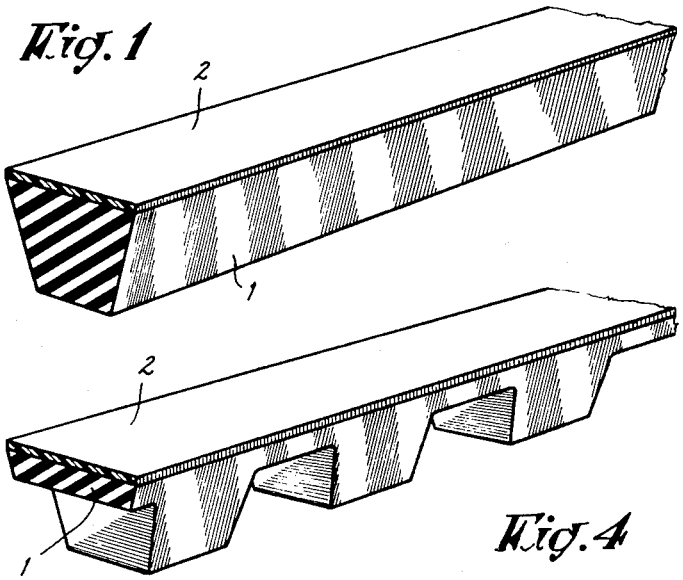
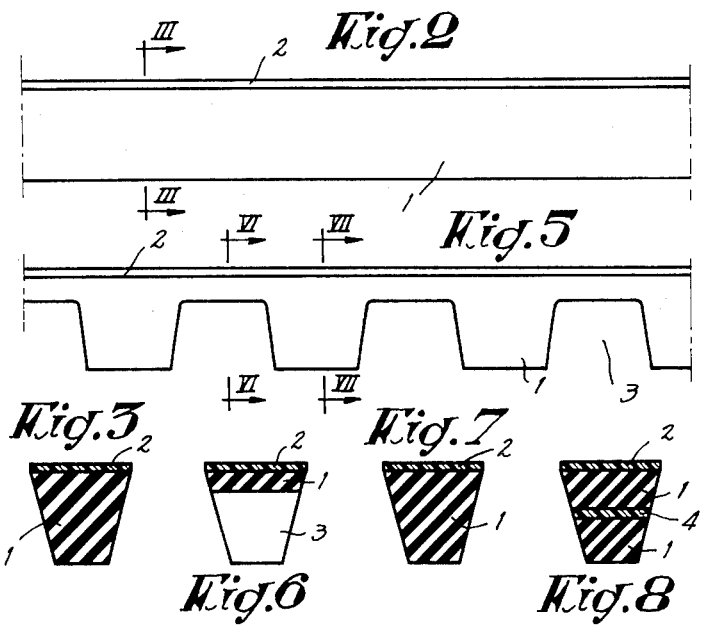
INVENTOR
D. Papageorges
BY
Richards & Geier
ATTORNEYS

# United States Patent Office 3,256,744
Patented June 21, 1966

3,256,744
HIGH RESISTANCE V BELT
Demetre Papageorges, Liege, Belgium, assignor to Etablissements Theodore Houben Société Anonyme, Verviers, Belgium, a Belgian company
Filed Dec. 16, 1963, Ser. No. 330,782
Claims priority, application Belgium, Dec. 17, 1962, 39,636, Patent 626,218; Dec. 3, 1963, 43,206, Patent 640,725
7 Claims. (Cl. 74—233)

The present invention is concerned with continuous V belts, either dented or notched and of the type consisting of a combination of a tensile resistant element, made out of some synthetic material, as for instance and by preference polyamides, and of an adhering material, made out of some natural or synthetic relatively elastic material, such as for instance rubber.

With two materials of this kind, various combinations have already been used for the manufacture of V belts.

It is general practice to use at least one layer, or respectively one strip of polyamide, sunk in the mass of rubber, in such a way that the polyamide strip, serving as tensile resistant element, is located approximately in the center of the zone of the belt which is engaged between the sides of the pulley, when the belt is being used.

In that construction, it has clearly been the wish to locate the strip of polyamide in the zone of the belt which is expected to be most severely stressed.

Such a fabrication can namely be found in French Patent No. 1,169,057 and in American Patent No. 2,995,176.

Nevertheless, such a fabrication presupposes the obligation of building up the belt from at least three parts, respectively the polyamide strip, and on either side of the latter a layer of rubber. Moreover, such a construction could be harmful for the resistant properties of the belt in numerous cases where a considerable effort has to be transmitted, or when smaller efforts must be transmitted at high speed and during a considerable amount of time. It will indeed be noticed that both surfaces of the polyamide strip are stressed in a different manner, due to the fact that there exists a slight difference in length between them, which, during operation, causes undesirable tangential stresses.

On the other hand, propositions have already been made with respect to such belts, for wrapping some protective material around them, generally some impregnated cloth, precisely to try, amongst other things, to reduce the harmful effects of these varying stresses on the different parts of the belt. Such a fabrication process has been described, amongst others, in French Patent No. 1,169,057. In certain cases, such means may prove perfectly effective, but they imply a slow, difficult and relatively expensive fabrication process.

The object of the present invention is to offer a new combination, providing considerable progress in the behaviour of the belt itself as well as in its fabrication process, and showing marked advantages.

This new combination is essentially characterized by the fact that the layer of polyamides is bonded to the back surface of the layer of rubber in such a way as to form the outer backing of the belt. Aforesaid layer of polyamides will generally consist of a thin strip with rectangular cross-section, whilst the layer of natural or synthetic rubber, or of any other appropriate elastic material, will be shaped so as to have a V shaped cross-section and a rectangular or dented or notched longitudinal section. The bottom of the hollows, in the case of dented or notched belts, may come very close to, or even reach the adjacent surface of aforesaid layer of polyamides, which will make the belts exceptionally flexible.

Compared with known types of belts using the same materials, the present combination has the substantial advantage, that the belt, even for the transmission of considerable efforts or for displacement at high speed, behaves as though it were fabricated of homogeneous rubber, but with an enormously increased tensile strength. It can indeed be seen, that the mass of rubber is in a way strapped in by the layer of polyamides in such a way in fact, that within the parts which are in contact with the grooved pulley, the elastic mass, i.e. the rubber, is practically hemmed in between the flanges of the grooved pulley and the strip of polyamides of very great tensile strength.

A further advantage can be found in the fact that due to the strip of polyamides being bonded to the greatest width of the elastic mass, it becomes possible, for a given cross-section of belt, to use a minimum thickness of polyamides.

Yet another advantage is revealed by the fact of the extreme simplicity of fabrication, considering that despite the relative complexity of the shape of these belts, which may be continuous V shaped, V shaped dented or V shaped notched, they can be manufactured by simple bonding of two elements fed from reels. At last, yet a further advantage can be discovered in the fact that the layer of polyamides, due to its external location with respect to the elastic mass, in no way interferes with the free reactions, or respective distortions of aforesaid mass of rubber within the peripheral limits positively bounded by aforesaid polyamide layer. In these conditions, one not only obtains that a belt conditioned in this manner has a maximum adhesion efficiency for all efforts to be transmitted and at any predetermined speed, but also that aforesaid layer of polyamides, only being stressed by reaction from the elastic material along its inside surface, bears no stress or constraint on its outer peripheral surface.

Finally, one more advantage is found in the fact that such belts can very easily and efficiently be spliced by their ends, either to form endless belts, or to repair a belt which has been accidentally cut through. The presence of the apparent layer of polyamides considerably facilitates the splicing.

According to the present invention, it is possible to combine these new characteristics with other known or unknown characteristics. For instance, one might constitute the layer of elastic material as one single homogeneous mass, or make it consist of at least two strips of materials with differing elasticity. For particular applications, it will also be possible to provide one or more strips of polyamide embedded within the mass of the elastic material, but only inasmuch as the dorsal or outer surface of the continuous, dented or notched V belt consists of a layer of polyamide.

The bonding between the layers of polyamides and of elastic materials will be effected by any appropriate means, and more particularly by the use of adhesive compounds, made up for instance with polyvinyl chloride, rubber solution, or others.

In a preferred form of embodiment of such dented or notched belts, the hollows shall have a depth which is greater than one half the height of the rubber mass, this depth being permitted to be equal, or very nearly so, to aforementioned height.

Merely as example, some forms of embodiment are described below and illustrated by the appended drawings in which:

FIGURE 1 shows a perspective view of a portion of a continuous V belt according to the present invention;
FIGURE 2 is a side view of same;
FIGURE 3 is a cross-section according to line III—III of FIGURE 2;

FIGURE 4 is a perspective view of a portion of a dented V belt;

FIGURE 5 is a side view of the portion shown in FIGURE 4;

FIGURES 6 and 7 respectively show cross-sections according to lines VI—VI and VII—VII of FIGURE 5;

FIGURE 8 is a transverse section through an alternative form of embodiment.

In FIGURES 1, 2 and 3, 1 indicates the continuous layer of elastic material which has a V shaped cross-section and 2 represents the strip of polyamides in its characteristic location revealed by the present invention.

In FIGURES 4, 5, 6 and 7, the same two elements 1–2 can again be identified, except that the elastic mass 1 is provided with a series of similar and equidistant hollows 3.

In the alternative form of embodiment of FIGURE 8, aforesaid characteristic elements 1 and 2 can again be identified, but a layer 4 of polyamide or any other appropriate material has been sandwiched between two parts of aforesaid mass 1.

Such belts can be manufactured to practically any dimensions.

The term "polyamides" is meant to express, in the most general way possible, any synthetic fibre-forming polymers of which the polyamides as well as the polyester rosins are the most appropriate for the fabrication of belts according to the present invention.

Aforesaid synthetic polymers can just as well be obtained by drawing out in one single mass to the desired thickness, or by the bonding of thin strips in sufficient number to obtain aforesaid required thickness. The latter method has the advantage of permitting to start off with reels of synthetic material of constant thickness and to build up strips of any width and of any thickness which may be compatible with the type of belt to be fabricated.

For the bonding amongst each other of the various plies of synthetic materials, and more generally of polyamides or polyester rosins, the same adhesive compound may be used as that which serves for solidly bonding together the elastic strips and the strips of synthetic material; for instance bonding adhesives with a polyvinyl chloride base.

For the production of the elastic materials, natural or synthetic rubber can be used, as well as synthetic rosins.

What I claim is:

1. A notched V-belt consisting of a rubber compression section, an outer polyamide tension section and an adhesive compound bonding said sections.

2. A notched V-belt in accordance with claim 1, wherein said adhesive has a polyvinyl chloride base.

3. A notched V-belt in accordance with claim 1, wherein the notches have a depth greater than one half of the height of said rubber section.

4. A notched V-belt in accordance with claim 3, wherein the depth of the notches is substantially equal to the height of said rubber section.

5. A notched V-belt consisting of a rubber compression section, a strip of a material different from rubber within the rubber compression section, an outer polyamide tension section and an adhesive compound bonding said sections.

6. A notched V-belt in accordance with claim 5, wherein said rubber compression section consists of a plurality of sections of different elasticity.

7. A notched V-belt in accordance with claim 5, wherein said strip consists of a polyamide.

References Cited by the Examiner

UNITED STATES PATENTS

| | | | |
|---|---|---|---|
| 2,642,751 | 6/1953 | Freedlander | 74—233 |
| 2,726,976 | 12/1955 | Waugh | 74—233 |
| 2,847,865 | 4/1958 | Rockoff et al. | 74—233 |
| 3,051,212 | 8/1962 | Daniels | 74—233 X |

DAVID J. WILLIAMOWSKY, *Primary Examiner.*

DON A. WAITE, *Examiner.*

J. A. WONG, *Assistant Examiner.*